(12) United States Patent
Datta et al.

(10) Patent No.: US 12,489,627 B2
(45) Date of Patent: Dec. 2, 2025

(54) DECENTRALIZED MULTI-AUTHORITY ATTRIBUTE-BASED ENCRYPTION WITH FULLY ADAPTIVE SECURITY

(71) Applicant: NTT Research, Inc., Sunnyvale, CA (US)

(72) Inventors: Pratish Datta, Sunnyvale, CA (US); Ilan Komargodski, Tel Aviv (IL); Brent Waters, Austin, TX (US)

(73) Assignee: NTT Research, Inc., Sunnyvale, CA (US)

( * ) Notice: Subject to any disclaimer, the term of this patent is extended or adjusted under 35 U.S.C. 154(b) by 278 days.

(21) Appl. No.: 18/288,379

(22) PCT Filed: Apr. 25, 2022

(86) PCT No.: PCT/US2022/026173
§ 371 (c)(1),
(2) Date: Oct. 25, 2023

(87) PCT Pub. No.: WO2022/232042
PCT Pub. Date: Nov. 3, 2022

(65) Prior Publication Data
US 2024/0283647 A1    Aug. 22, 2024

Related U.S. Application Data

(60) Provisional application No. 63/179,862, filed on Apr. 26, 2021.

(51) Int. Cl.
*H04L 9/32*    (2006.01)
*H04L 9/08*    (2006.01)
*H04L 9/40*    (2022.01)

(52) U.S. Cl.
CPC .............. *H04L 9/32* (2013.01); *H04L 9/08* (2013.01); *H04L 9/40* (2022.05)

(58) Field of Classification Search
CPC .............. H04L 9/32; H04L 9/40; H04L 9/08
See application file for complete search history.

(56) References Cited

U.S. PATENT DOCUMENTS 9,209,974 B1    12/2015    Akinyele
2010/0185861 A1    7/2010    Chase
(Continued)

OTHER PUBLICATIONS

Shynu, P. G., and K. John Singh. "Privacy preserving secret key extraction protocol for multi-authority attribute-based encryption techniques in cloud computing." International Journal of Embedded Systems 10.4 (2018): 287-300. [Retrieved on Aug. 9, 2022] Retrieved from the Internet.
(Continued)

*Primary Examiner* — Robert B Leung
*Assistant Examiner* — Howard H. Louie
(74) *Attorney, Agent, or Firm* — CipherLaw

(57) ABSTRACT

The invention relates to systems, methods, network devices, and machine-readable media for encrypting and decrypting messages in a decentralized multi-authority attribute-based encryption (MA-ABE) scheme that is provably fully-adaptively secure, specifically, secure against an attacker that may corrupt some of the authorities as well as perform key queries adaptively throughout the lifetime of the system.

12 Claims, 4 Drawing Sheets

(56) References Cited

U.S. PATENT DOCUMENTS

| | | | |
|---|---|---|---|
| 2012/0314854 A1* | 12/2012 | Waters | H04L 9/088 |
| | | | 380/28 |
| 2013/0339754 A1* | 12/2013 | Takashima | H04L 9/3073 |
| | | | 713/189 |
| 2015/0222605 A1* | 8/2015 | Ignatenko | H04L 9/3073 |
| | | | 713/168 |
| 2018/0054301 A1 | 2/2018 | El-Alfy | |
| 2018/0176015 A1* | 6/2018 | Wang | H04L 9/0825 |
| 2019/0230094 A1 | 7/2019 | Pletea | |
| 2020/0336292 A1 | 10/2020 | Soriente | |

OTHER PUBLICATIONS

Written Opinion of the International Searching Authority and International Search Report in PCT/US22/26173; Aug. 9, 2022; 6 pgs.

* cited by examiner

DECENTRALIZED MULTI-AUTHORITY ATTRIBUTE-BASED ENCRYPTION WITH FULLY ADAPTIVE SECURITY

CROSS-REFERENCE TO RELATED APPLICATIONS

This application is a national stage application, filed under 35 U.S.C. § 371, of International Patent Application No. PCT/US2022/026173, filed Apr. 25, 2022, which claims the benefit of U.S. Provisional Application No. 63/179,862, filed Apr. 26, 2021, the contents of both of which are hereby incorporated in their entireties.

FIELD OF THE INVENTION

The present disclosure relates to multi-authority attribute-based encryption schemes that are provably fully-adaptively secure, specifically, secure against an attacker that may corrupt some of the authorities as well as perform key queries adaptively throughout the life-time of the system.

BACKGROUND OF THE INVENTION

Attribute-based encryption (ABE) schemes allow fine-grained access control when accessing encrypted data: Such encryption schemes support decryption keys that allow users that have certain credentials (or attributes) to decrypt certain messages without leaking any additional information. Over the years, the challenge of designing ABE schemes has received tremendous attention resulting in a long sequence of works achieving various trade-offs between expressiveness, efficiency, security, and underlying assumptions.

Attribute-based encryption is a generalization of traditional public-key encryption that offers fine-grained access control over encrypted data based on the credentials (or attributes) of the recipients. ABE comes in two avatars: ciphertext-policy and key-policy. In a ciphertext-policy ABE (CP-ABE), as the name suggests, ciphertexts are associated with access policies and keys are associated with attributes. In a key-policy ABE (KP-ABE), the roles of the attribute sets and the access policies are flipped, i.e., ciphertexts are associated with attributes and keys are associated with access policies. In both cases, decryption is possible only when the attributes satisfy the access policy. Moreover, it is required that given any ciphertext created with respect to an access policy, no group of colluding users none of whom individually possesses a secret key corresponding to an attribute set satisfying the access policy, should be able to decipher the encrypted message. This property is known as collusion resistance.

Since its inception by Goyal, Pandey, Sahai and Waters, ABE has become a fundamental cryptographic primitive with a long list of potential applications. Therefore, the task of designing ABE schemes has received tremendous attention by the cryptographic community resulting in a long sequence of works achieving various trade-offs between expressiveness, efficiency, security, and underlying assumptions.

Multi-Authority ABE

There is one major limitation in a standard ABE scheme: In an ABE scheme, each user must go to the single master authority and prove that he has a certain set of attributes in order to receive the secret keys corresponding to each of those attributes. This means we must have one trusted authority who monitors all attributes e.g. driver's licenses, voter registration, and college enrollment. In reality, however, there are different entities responsible for issuing and maintaining the different attributes, e.g. the DMV is the controller of driver licenses and similarly the Board of Elections and the University office for the other two attributes, respectively. Therefore, we would want to be able to entrust each of the attributes to a different (and perhaps not entirely trusted) authority.

Multi-Authority Attribute-Based Encryption: In ABE schemes, restricted decryption keys can only be generated and issued by a central authority who possesses the master secret key. Chase introduced the notion of multi-authority ABE (MA-ABE) which allows multiple parties to play the role of an authority. More precisely, in an MA-ABE, there are multiple authorities which control different attributes and each of them can issue secret keys to users possessing attributes under their control without any interaction with the other authorities in the system. Given a ciphertext generated with respect to some access policy, a user possessing a set of attributes satisfying the access policy can decrypt the ciphertext by pulling the individual secret keys it obtained from the various authorities controlling those attributes To address the above problem, the notion of multi-authority ABE (MA-ABE) schemes was introduced. In an MA-ABE, there are multiple authorities which control different attributes and each of them can issue secret keys to users possessing attributes under their control without any interaction with the other authorities in the system. Given a ciphertext generated with respect to some access policy, a user possessing a set of attributes satisfying the access policy can decrypt the ciphertext by pulling the individual secret keys it obtained from the various authorities controlling those attributes. The security requires collusion resistance against unauthorized users as described above with the important difference that now some of the attribute authorities may be corrupted and therefore may collude with the adversarial users.

After few initial attempts that had various limitations, Lewko and Waters were able to design the first truly decentralized MA-ABE scheme in which any party can become an authority and there is no requirement for any global coordination other than the creation of an initial trusted setup. In their scheme, a party can simply act as an authority by publishing a public key of its own and issuing private keys to different users that reflect their attributes. Different authorities need not even be aware of each other and they can join the system at any point of time. There is also no bound on the number of attribute authorities that can ever come into play during the lifetime of the system. Their scheme supports all access policies computable by $NC^1$ circuits. Furthermore, utilizing the powerful dual system technique, security is proven assuming a composite order bilinear group with "subgroup decision"-style assumptions and in the random oracle model.

Following Lewko and Waters, there were several extensions and improvements. Okamoto and Takashima gave a construction over prime order bilinear groups relying on the decision-linear (DLIN) assumption. Rouselakis and Waters and Ambrona and Gay provided efficiency improvements but used the less standard q-type assumptions and the generic group model respectively. Datta et al. gave the first Learning With Errors (LWE)-based construction supporting a non-trivial class of access policies. All of the above are in the random oracle model.

Security: The natural MA-ABE security definition requires the usual collusion resistance against unauthorized users with the important difference that now some of the attribute authorities may be corrupted and therefore may collude with the adversarial users. While some constructions support adaptive key queries, there is no known construction, under any assumption, which supports fully adaptive corruption of authorities. Given the distributed nature of MA-ABE it seems unsatisfying to assume that an attacker commits on a corrupted set of authorities at the beginning of the security game, even before seeing any secret key. Indeed, in reality we do not even expect all attribute authorities to join the system at the same time. Therefore, the "static corruptions" model that previous works have considered does not capture realistic attack scenarios, and it would be desirable to improve it by supporting adaptive corruption of authorities.

Getting fully adaptive security is a gap in existing constructions. This is one of the rare cases where generic complexity leveraging/guessing style arguments fail (even if we are fine with a sub-exponential security loss). Indeed, applying these arguments in our setting results in an exponential loss proportional to the maximum number of authorities per ciphertext. Thus, there needs to be a pre-determined maximum number of authorities per ciphertext limit and then the security parameter needs to be chosen appropriately. It would be further desirable to have a truly decentralized scheme where any party could join as an authority at any point in time and there is no limit to the number of authorities. Decentralized multi-authority attribute-based encryption (MA-ABE) is a distributed generalization of standard (ciphertext-policy) attribute-based encryption where there is no trusted central authority: any party can become an authority and issue private keys, and there is no requirement for any global coordination other than the creation of an initial set of common reference parameters.

Standard complexity leveraging style arguments do not work in the multi-authority setting. Thus, there is a need for a construction that can resist adaptive corruptions of authorities, no matter the assumptions used.

BRIEF SUMMARY OF THE INVENTION

Some embodiments of the invention include systems, methods, network devices, and machine-readable media for encrypting a message according to a multi-authority attribute-based encryption scheme, the system comprising a processor configured for: receiving an electronic message m comprising $m_t$ bits for encryption; storing the electronic message in a computerized storage media; executing a global setup algorithm to generate global parameters by generating a group G; sampling g and h as two generators of G; sampling seed for a seeded extractor; executing an authority setup algorithm to generate a public and secret key pair by: sampling two exponents $y_A$ and $y_b$; setting a public key to be $(g^{\{y_A\}}, g^{\{y_b\}})$; setting a secret key to be $(y_A$ and $y_b)$; executing an encryption algorithm for the message m and an access policy M, by: sampling s, $r_A$, $r_B$; computing: $C_{\{1,A\}}=g^{\{r_A\}}$; $C_{\{1,B\}}=g^{\{r_B\}}$; $C_{\{2,A\}}=g^{\{y_A*r_A\}}g^{\{s\}}$; $C_{\{2,B\}}=g^{\{y_B*r_A\}}g^{\{-s\}}$; C=m xor Ext (e(g, h), seed); storing C, $C_{\{1,A\}}$, $C_{\{1,B\}}$, $C_{\{2,A\}}$, $C_{\{2,B\}}$ as the encrypted message in a computerized storage media; and executing a key generation algorithm, by outputting $(H(GID)*h)^{\{y_A\}}$ and $(H(GID))^{\{y_B\}}$, where H is a global cryptographic hash function mapping to a group.

In some further embodiments, any party can join as an authority at any point in time and there is no limit to the number of authorities. In some further embodiments, the method is fully adaptively secure. In some further embodiments, the method is provably fully adaptively secure, such that it is secure against an attacker that may corrupt some of the authorities as well as perform key queries adaptively throughout the lifetime of the system. In some further embodiments, the adversary does not hold enough secret keys or authority master keys to decrypt a message that is encrypted with respect to the access structure.

In some embodiments, the computerized processor is further configured to decrypt the message by: storing the message encrypted according to an attribute-based encryption scheme in a computerized storage media; executing a decryption algorithm, by: receiving a key comprising components generated as $(K_{\{GID,A\}}, K_{\{GID,B\}})$ and a ciphertext (C, $C_{\{1,A\}}$, $C_{\{1,B\}}$, $C_{\{2,A\}}$, $C_{\{2,B\}}$); computing $D_A=e(C_{\{2,A\}}, H(GID)*h)/e(C_{\{1,A\}}, K_{\{GID,A\}})$; computing $D_B=e(C_{\{2,B\}}, H(GID))/e(C_{\{1,B\}}, K_{\{GID,B\}})$; and outputting C xor Ext $(D_A*D_B$, seed).

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
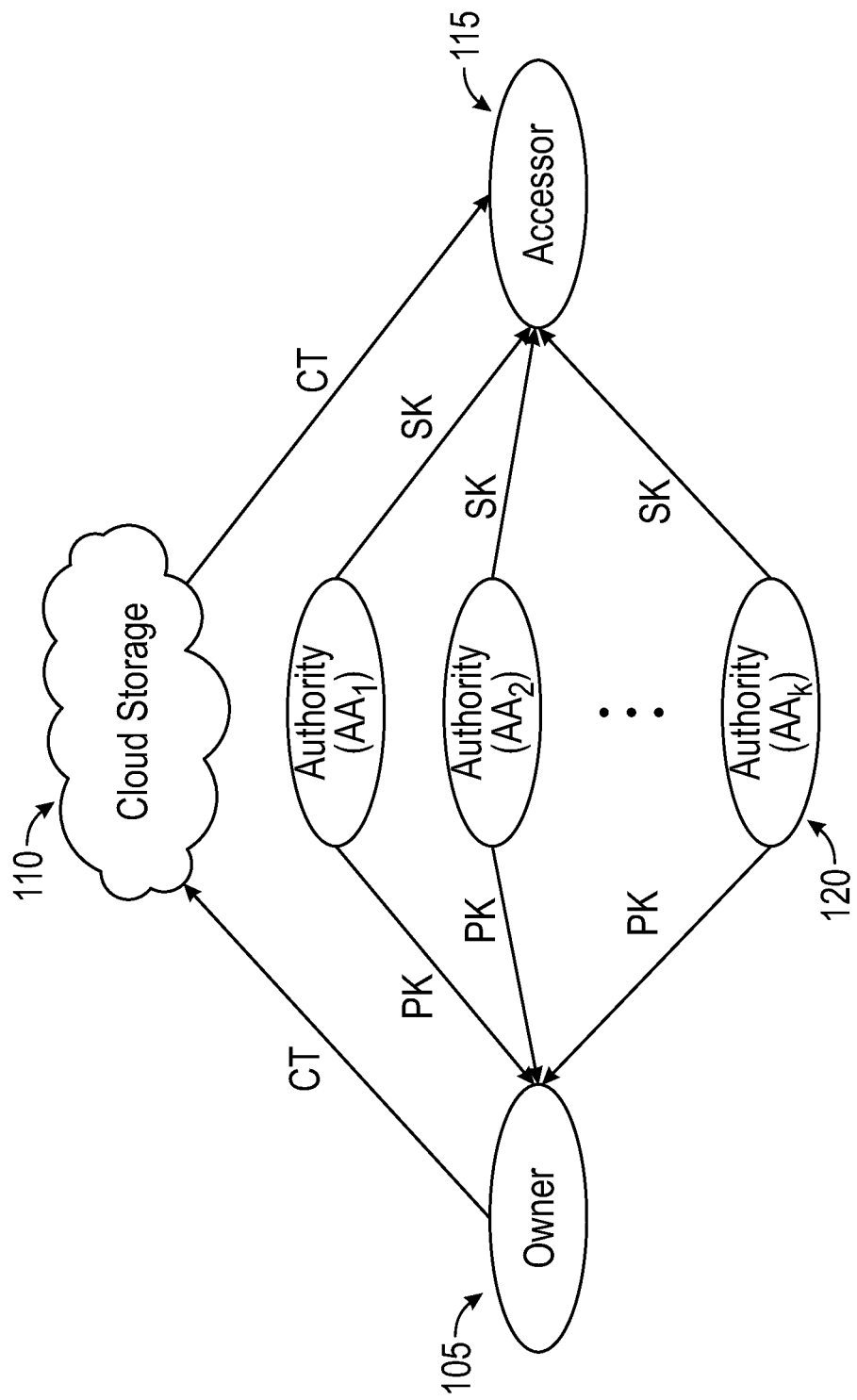
FIG. 1 illustrates an example system architecture for a decentralized multi-authority attribute-based encryption scheme.

We construct the first truly decentralized MA-ABE schemes which are provably secure even when fully adaptive corruption of authorities are allowed, in addition to fully adaptive key queries. Our schemes are based on bilinear groups with standard polynomial hardness assumptions and in the random oracle model. We emphasize that our constructions are the first provably secure schemes against fully adaptive corruptions of authorities under any assumption.

We first give a construction based on bilinear groups of composite order with (by now) standard subgroup-decision assumptions, and then give a construction in prime order bilinear groups where the k-Linear (k-Lin) or more generally the matrix Diffie-Hellman (MDDH) holds.

Theorem (Informal): Assume a composite order bilinear group where "standard" subgroup-decision assumptions hold. Then, there is a fully-adaptive MA-ABE scheme in the random oracle model.

The assumptions that we use in the above theorem have been used multiple times in the past and they were shown to hold in the generic bilinear group model. However, we still point out that composite order-based constructions have few drawbacks compared to the more standard prime order setting. First, in prime order groups, we can obtain security under more standard assumptions such as k-LIN or bilinear Diffie-Hellman (BDH) assumption. Second, in prime order groups, we can achieve much more efficient systems for the same security levels. This is because in composite order groups, security typically relies on the hardness of factoring the group order. In turn, this requires the use of large group orders, which results in considerably slower group and pairing operations.

To this end, starting with Freeman and Lewko, multiple frameworks and tools have been developed to translate existing composite order group constructions into prime order analogues. We use a recent set of tools due to Chen, Gong, Kowalczyk, and Wee and manage to obtain a construction in (asymmetric) bilinear groups of prime order whose security is based on the more standard k-Lin or MDDH assumption. Our construction is secure based on any choice of k. For instance, setting k=1 we get security under the Symmetric External Diffie-Hellman Assumption (SXDH), and setting k=2 corresponds to security under the DLIN assumption.

Theorem (Informal): Assume a prime order bilinear group where the k-Lin or MDDH assumption holds. Then, there is a fully-adaptive MA-ABE scheme in the random oracle model.

Technical Overview

Our MA-ABE (like all other known MA-ABE schemes) is designed under the assumption that each user in the system has a unique global identifier GID coming from some universe of global identifiers $\mathcal{GID} \cup \{0,1\}^*$. We shall further assume (without loss of generality) that each authority controls just one attribute, and hence we can use the words "authority" and "attribute" interchangeably. (We note that this restriction can be relaxed to support an a priori bounded number of attributes per authority.) We denote the authority universe by $\mathcal{AU}$.

Let us recall the syntax of decentralized MA-ABE for $NC^1$ access policies, which is well known to be realizable by (monotone) linear secret sharing schemes (LSSS). A decentralized MA-ABE scheme consists of 5 procedures GlobalSetup, AuthSetup, KeyGen, Enc, and Dec. The GlobalSetup procedure gets as input the security parameter (in unary encoding) and outputs global public parameters. All of the other procedures depend on these global parameters (we may sometimes not mention them explicitly when they are clear from context). The AuthSetup procedure can be executed by any authority $u \in \mathcal{AU}$ to generate a corresponding public and master secret key pair, $(PK_u, MSK_u)$. An authority holding the master secret key $MSK_u$ can then generate a secret key $SK_{GID,u}$ for a user with global identifier GID. At any point in time, using the public keys $\{PK_u\}$ of some authorities, one can encrypt a message msg relative to some linear secret sharing policy $(M, \rho)$, where M is the policy matrix and $\rho$ is the function that assigns row indices in the matrix to attributes controlled by those authorities, to get a ciphertext CT. Finally, a user holding a set of secret keys $\{SK_{GID,u}\}$ (relative to the same GID) can decrypt a given ciphertext CT if and only if the attributes corresponding to the secret it possesses "satisfy" the access structure with which the ciphertext was generated. If the MA-ABE scheme is built in the random oracle model as is the case in this paper and in all previous collusion resistant MA-ABE schemes, the existence of a public hash function H mapping the global identifiers in $\mathcal{GID}$ to some appropriate space is considered. This hash function H is generated by GlobalSetup and is modeled as a random oracle in the security proof.

Fully Adaptive Security

Just like standard ABE, the security of an MA-ABE scheme demands collusion resistance, that is, no group of colluding users, none of whom is individually authorized to decrypt a ciphertext, should be able to decrypt the same when they pull their secret key components together. However, in case of MA-ABE, it is further required that collusion resistance should hold even if some of the attribute authorities collude with the adversarial users and thereby those users can freely obtain secret keys corresponding to the attributes controlled by those corrupt authorities. Decentralized MA-ABE further allows the public and secret keys of the corrupt authorities to be generated in a malicious way and still needs collusion resistance. This is crucial since, in a decentralized MA-ABE scheme, anyone is allowed to act as an attribute authority by generating its public and secret keys locally and independently of everyone else in the system. We are aiming for fully adaptive security which is roughly defined by the following game:

Global Setup: The challenger runs GlobalSetup to generate global public parameters.

Query Phase I: The attacker is allowed to adaptively make a polynomial number of queries of the following form:
  (a) Authority Setup Query: the challenger runs AuthSetup to create a public/master key pair for an authority specified by the adversary.
  (b) Secret Key Query: the challenger runs KeyGen to create a secret key for a given attribute.
  (c) Authority Master Key Query: the challenger provides the attacker the master secret key corresponding to some authority of the adversary's choice.

Challenge Phase: The adversary submits two messages $msg_0$, $msg_1$, and an access structure along with a set of public keys of authorities involved in the access structure. It gets back from the challenger an encryption of one of the messages (chosen at random) with respect to the access structure. It is crucial that the adversary does not hold enough secret keys/authority master keys to decrypt a message that is encrypted with respect to the access structure.

Query Phase 2: Same as in Query Phase 1 (while making sure that the constraint from the challenge phase is not violated).

Guess: The attacker submits a guess for which message underlies the challenge ciphertext.

All previous MA-ABE schemes consider a much weaker definition where the adversary must commit during the Global Setup phase on the set of authorities in the system as well as on the subset of corrupted authorities. Already at that point, the private/public key pairs of all non-corrupt authorities are created by the challenger and the public keys are given to the attacker. (That is, during Query Phase I and II, only queries of form 2 (secret key query) are allowed.) Our fully adaptive definition is much more realistic given the distributed nature of MA-ABE.

Previous Works and Our Approach

As in any ABE scheme, the challenge in MA-ABE is to make it collusion resistant. Usually, ABE schemes achieve collusion resistance by using the system's authority who knows a master secret key to "tie" together different key components representing the different attributes of a user with the help of fresh randomness specific to that user. Such randomization would make the different key components of a user compatible with each other, but not with the parts of a key issued to another user.

In a multi-authority setting, however, we want to satisfy the simultaneous goals of autonomous key generation and collusion resistance. The requirement of autonomous key generation means that standard techniques for key randomization cannot be applied since there is no one party to compile all the pieces together. Furthermore, in a decentralized MA-ABE system each component may come from a different authority, where such authorities have no coordination and are possibly not even aware of each other. To overcome this, all previous decentralized MA-ABE schemes use the output of a public hash function applied on the user's global identity, GID, as the randomness tying together multiple key components issued to a specific user by different authorities.

To see the challenge let us focus on one particular construction due to Lewko and Waters. Although this is the very first truly decentralized MA-ABE scheme, all relevant follow-up works heavily rely on it and therefore suffer from similar problems. The security proof of the Lewko and Waters construction uses the dual system technique originally developed by Waters. In a dual system, ciphertexts and keys can take on two forms: normal or semi-functional. Semi-functional ciphertexts and keys are not used in the real system, they are only used in the security proof. A normal key can decrypt normal or semi-functional ciphertexts, and a normal ciphertext can be decrypted by normal or semi-functional keys. However, when a semi-functional key is used to decrypt a semi-functional ciphertext, decryption will fail. Security for dual systems is proved using a sequence of "indistinguishable" games. The first game is the real security game (with normal ciphertext and keys). In the next game, the ciphertext is semi-functional, while all the keys are normal. For an attacker that makes q secret key requests, we define q games, where in the k-th one, the first k keys are semi-functional while the remaining keys are normal. In game q, all the keys and the challenge ciphertext given to the attacker are semi-functional. Hence, none of the given keys are useful for decrypting the challenge ciphertext.

The proof of Lewko and Waters follows this high level approach, but inherently relies on the fact that the corrupted authorities are specified in advance. There, towards the end of the proof, all keys are semi-functional and the challenge ciphertext is also semi-functional. The goal in the last hybrid is to move to a game where the semi-functional challenge ciphertext is of a random message (rather than the original message). For this to be indistinguishable, they need to "shut off" the rows in the matrix of the access policy corresponding to the corrupted authorities. This is done by using an information theoretic tool of choosing a vector which is orthogonal to those rows in the challenge ciphertext (such a vector must exist since the corrupted set must be unauthorized). Effectively, this allows them to completely ignore the existence of authority master keys corresponding to those rows, while for the other rows the inexistence of a secret key was already taken care of when they moved to a game where all keys are semi-functional.

This approach clearly fails when authorities can be corrupted adaptively. First, technically it is impossible to "shut off" the rows corresponding to the corrupted authorities since the latter may not be even known at the time the challenge ciphertext is created since authorities may be corrupted after the challenge ciphertext is created where the challenger should be able to give the adversary the corresponding master key. However, with the (proof) approach of Lewko and Waters this is impossible since the challenger (at that point) does not even have a properly formed master key for the authority.

Overcoming Barriers and the (Composite Order) Scheme

To solve this problem we must figure out how to integrate corrupted authorities into a dual system encryption proof. This is challenging because as in Lewko and Waters our authority keys will consist simply of exponents over a group of composite order $N=p_1 p_2 p_3$. Since these authority keys are exponents and not group elements there is no apparent way of moving them to be semi-functional in the way that a proof typically modifies group-based secret keys.

In our proof we devise a new method to utilize such keys. The first step of our proof is to make a ciphertext semi-functional over the $p_3$ subgroup. The argument relies on two key facts. (1) Any subset of authorities the attacker compromises will not satisfy the access structure. Thus, the corrupted authorities alone are not enough to (information theoretically) determine if the challenge ciphertext is semi-functional. (2) The keys given out by uncorrupted authorities will not have any component in the order $p_3$ subgroup, thus they will not help out such an attacker (at this step). Put together this gives a method to leverage the information theoretic steps in order to handle adaptive corruption of authorities. Our approach uses both computational and information theoretic arguments to step between different hybrid experiments. A critical feature is that any step that relies on the attacker's keys not satisfying the access structure will be an information theoretic argument and thus sidesteps any problems revolving around guessing which authorities are corrupted. (There will of course be multiple computational arguments between and setting up the information theoretic ones.) A similar high-level approach of using information regarding what the adversary corrupts only in information theoretic arguments was used in few previous dual system proofs, but here we are able to implement the technique in the (more challenging) distributed setting and enfolding corrupted authorities.

Our approach allows us to establish both semi-functional keys and ciphertexts in a given subspace of the cryptosystem. However, it comes with a big caveat. While the semi-functional argument is established in the $p_3$ subgroup we had to keep it separate from the ciphertext component blinding the message which lives solely in the $p_1$ subgroup. At this stage it is therefore unclear that all the work we did will even hide the message at all. Therefore the next portion of our proof needs to "bleed" the semi-functional portions of the ciphertext into the portions blinding the message. To do this we need to establish a two subsystem construction where our construction essentially looks like two copies of the multi-authority ABE scheme of Lewko and Waters. Here we will take turn where we first bleed over into one and then the other.

We call this novel technique as dual system with dual subsystems. This technique utilizes the semifunctionality within one subsystem to introduce semifunctionality within the other. More specifically, we introduce a special group element within the public parameters which originally lives within the $p_1$ subgroup. Our target is to eventually make this group element live in both the $p_1$ and $p_2$ subgroups and blind the message with both its $p_1$ and $p_2$ segments. Then we would cleverly transform the challenge ciphertext and keys in such a way that the $p_2$ segment of this special group element remains information-theoretically hidden to the adversary and that entropy can then be amplified using a suitable randomness extractor to hide the encrypted message completely.

We set the user secret key components for the two subsystem asymmetrically, namely, we multiply the special group element within the user secret key components that correspond to the first subsystem while do not multiply it within those corresponding to the second subsystem. Then, we first bleed the semifunctional portions within the $p_3$ subgroup of the second subsystem into the $p_2$ subgroup of the same to make it semifunctional. After that, we utilize this semifunctionality of the second subsystem to switch the special group element from being embedded within the user secret key components of the first subsystem to those corresponding to the second subsystem. Once we are done with this step, we then bleed the semifunctional portions within the $p_3$ subgroup of the first subsystem into the $p_2$ portions of the same. At this point, the $p_2$ segment of the ciphertext component blinding the message become completely independent of the $p_2$ segments of all the other ciphertext and key components, so that we can utilize its entropy to blind the message information-theoretically.

We would like to emphasize that all applications of the dual system methodology so far only dealt with a single system and such two subsystem idea is completely new to our work. Also, the problem we addressed in this work seems beyond the scope of the standard single-system dual system technique since it is not clear how to bleed the semifunctional portions into the ciphertext component blinding the message and make the user keys independent of that special group element within a single system. As is evident from our work which resolves a longstanding open problem, this new technique is very powerful. We envision that it would find additional new applications related to adaptive security problems which seems beyond the scope of the existing variants of the dual system encryption methodology, e.g., constructing adaptively secure functional encryption schemes beyond linear functions under standard group-based assumption.

The Construction:

Recall that our scheme relies on bilinear group G of composite order N which is a product of three primes, that is, $N=p_1 p_2 p_3$ with subgroups $\mathbb{G}_{p_1}$, $\mathbb{G}_{p_2}$, and $\mathbb{G}_{p_3}$. We also make use of a seeded randomness extractor Ext and let seed be a seed for it. The elements $g_1$ and h are uniformly random generators of the subgroup $\mathbb{G}_{p_1}$ that along with seed are part of the global parameters GP. H is a global hash function that we model as a random oracle in the security proof.

At a very high level, as is evident from the construction, the encryption algorithm blinds the message msg with the term $\text{Ext}(e(g_1, h)^s, \text{seed})$, where s is a random element in $\mathbb{Z}_N$. The goal in the security proof is to show that given the view of the adversary there is enough entropy left in $e(g_1, h)^s$ so that the message is indeed hidden. There are two secret sharing schemes involved, one of s and the other of −s. Let us denote the shares of s with $\sigma_{A,x}$ and the shares of −s with $\sigma_{B,x}$. The decryptor recovers $e(g_1, H(GID) \cdot h)^{\sigma_{A,x}}$ and $e(g_1, H(GID))^{\sigma_{B,x}}$ by appropriately pairing their keys for attributes and ciphertext components. If the user holds sufficient secret keys to decrypt a ciphertext, the two terms $e(g_1, H(GID) \cdot h)^{\sigma_{A,x}}$ and $e(g_1, H(GID))^{\sigma_{B,x}}$ can be used to recover $e(g_1, H(GID) \cdot h)^s$ and $e(g_1, H(GID))^{-s}$ which, if multiplied, give the blinding factor $e(g_1,h)^s$, as necessary.

AuthSetup(GP, u): The algorithm chooses random values $y_{A,u}, y_{B,u} \in \mathbb{Z}_N$ and outputs $$PK_u = \left(g_1^{y_{A,u}}, g_1^{y_{B,u}}\right) \quad MSK_u = (y_{A,u}, y_{B,u}).$$

Enc(GP, msg, (M, ρ), $\{PK_u\}$): It first chooses a random value $s \leftarrow \mathbb{Z}_N$. It then uses the LSSS access policy (M, ρ) to generate a secret sharing of s where $\sigma_{A,x}$ will be the share for all $x \in [\ell]$, i.e, for all $x \in [\ell]$, let $\sigma_{A,x} = M_x \cdot v_A$, where $v_A \leftarrow \mathbb{Z}_N^d$ is a random vector with s as its first entry and $M_x$ is the $x^{th}$ row of M. The access policy (M, ρ) is of the form $M=(M_{x,j})_{\ell \times d} = (M_1, \ldots, M_\ell)^T \in \mathbb{Z}_N^{\ell \times d}$ and $\rho: [\ell] \to \mathcal{AU}$. The function ρ associates rows of M to authorities. We assume that ρ is an injective function, that is, an authority/attribute is associated with at most one row of M. This can be extended to a setting where an attribute appears within an access policy for at most a bounded number of times. It additionally creates another secret sharing of −s with respect to the LSSS access policy (M, ρ) where $\sigma_{B,x}$ is the corresponding share for ρ(x) for all $x \in [\ell]$, i.e., for all $x \in [\ell]$, $\sigma_{B,x} = M_x \cdot v_B$, where $v_B \leftarrow \mathbb{Z}_N^d$ is a random vector with −s as its first entry. The procedure generates the ciphertext as follows: For each row $x \in [\ell]$, it chooses random $r_{A,x}, r_{B,x} \leftarrow \mathbb{Z}_N$ and outputs the ciphertext $$CT = \left((M, \rho), C, \{C_{1,A,x}, C_{2,A,x}, C_{1,B,x}, C_{2,B,x}\}_{x \in [\ell]}\right), \text{ where}$$

$$C = msg \oplus \text{Ext}(e(g_1, h)^s, \text{seed}), \; C_{1,A,x} = g_1^{r_{A,x}} \;\; C_{2,A,x} = g_1^{y_{A,\rho(x)} r_{A,x}} g_1^{\sigma_{A,x}}$$

$$C_{1,B,x} = g_1^{r_{B,x}} \;\; C_{2,B,x} = g_1^{y_{B,\rho(x)} r_{B,x}} g_1^{\sigma_{B,x}}.$$

KeyGen(GP, GID, $MSK_u$): The authority attribute u generates a secret key $SK_{GID,u}$ for GID as $SK_{GID,u} = (K_{GID,A,u}, K_{GID,B,u})$, where $$K_{GID,A,u} = (H(GID) \cdot h)^{y_{A,u}} \quad K_{GID,B,u} = (H(GID))^{y_{B,u}}.$$

Dec(GP, CT, GID, $\{SK_{GID,u}\}$): Decryption takes as input the global parameters GP, the hash function H, a ciphertext CT for an LSSS access structure (M, ρ) with $M \in \mathbb{Z}_N^{\ell \times d}$ and $\rho: [\ell] \to \mathcal{AU}$, the user's global identifier $GID \in \mathcal{GID}$, and the secret keys $\{SK_{GID,\rho(x)}\}_{x \in I}$ corresponding to a subset of rows of M with indices $I \subseteq [\ell]$. If $(1, 0, \ldots, 0)$ is not in the span of these rows, $M_I$, then decryption fails. Otherwise, the decryptor finds coefficients $\{w_x \in \mathbb{Z}_N\}_{x \in I}$ such that $(1, 0, \ldots, 0) = \Sigma_{x \in I} w_x \cdot M_x$.

For all $x \in I$, the decryption algorithm computes:

$$D_{A,x} = e(C_{2,A,x}, H(GID) \cdot h) \cdot e(C_{1,A,x}, K_{GID,A,\rho(x)})^{-1} = e(g_1, H(GID) \cdot h)^{\sigma_{A,x}}$$

$$D_{B,x} = e(C_{2,B,x}, H(GID)) \cdot e(C_{1,B,x}, K_{GID,B,\rho(x)})^{-1} = e(g_1, H(GID))^{\sigma_{B,x}}.$$

It computes $D = \Pi_{x \in I} (D_{A,x} \cdot D_{B,x})^{w_x} = e(g_1, h)^s$ and outputs $C \oplus \text{Ext}(D, \text{seed}) = msg$. The proposed scheme is correct by inspection.

Porting to Prime Order Groups

As mentioned, there have been many works trying to come up with a method to translate existing composite order group constructions into prime order analogues. All of these frameworks are different and have varying levels of simplicity or generality. We use the recent framework of Chen et al. which seems to be the most efficient and (arguably) the simplest to use, and succeed in adapting the construction as well as the proof from the composite order setting to the prime order setting.

This framework, in a high level, shows how to simulate a composite order group and its subgroups using a prime order group while guaranteeing a prime order analogue of various subgroup decision style assumptions. These analogues follow from the standard k-Linear assumption (and more generally, the MDDH assumption). Here, since the translation process is not completely black box and needs to be adapted for the scheme at hand, we need to introduce a few extra technical ideas to handle our specific setting. Specifically, the proof of security of our prime order construction relies not only on subgroup decision style assumptions but also on few information theoretic arguments as well as on the security of a random oracle. Using the framework and making it work on our scheme is fairly technical and systematic; we refer to the technical section for details. Nevertheless, we point out that the high level idea as well as the sequence of hybrids is the same as in the composite order case.

Preliminaries

A function negl: $\mathbb{N} \to \mathbb{R}$ is negligible if it is asymptotically smaller than any inverse-polynomial function, namely, for every constant $c>0$ there exists an integer $N_c$ such that $\text{negl}(\lambda) \leq \lambda^{-c}$ for all $\lambda > N_c$. We let $[n] = \{1, \ldots, n\}$.

We use bold lower case letters, such as v, to denote vectors and upper-case, such as M, for matrices. We assume all vectors, by default, are column vectors. The ith row of a matrix is denoted $M_i$ and analogously for a set of row indices I, we denote $M_I$ for the submatrix of M that consists of the rows $M_i$ for all $i \in I$. For an integer $q \geq 2$, we let $\mathbb{Z}_q$ denote the ring of integers modulo q. We represent $\mathbb{Z}_q$ as integers in the range $(-q/2, q/2]$.

Indistinguishability: Two sequences of random variables $\mathcal{X} = \{\mathcal{X}_\lambda\}_{\lambda \in \mathbb{N}}$ and $\mathcal{Y} = \{\mathcal{Y}_\lambda\}_{\lambda \in \mathbb{N}}$ are computationally indistinguishable if for any non-uniform PPT algorithm $\mathcal{A}$ there exists a negligible function $\text{negl}(\bullet)$ such that $|\Pr[\mathcal{A}(1^\lambda, \mathcal{X}_\lambda) = 1] - \Pr[\mathcal{A}(1^\lambda, \mathcal{Y}_\lambda) = 1]| \leq \text{negl}(\lambda)$ for all $\lambda \in \mathbb{N}$.

For two distributions $\mathcal{D}$ and $\mathcal{D}'$ over a discrete domain $\Omega$, the statistical distance between $\mathcal{D}$ and $\mathcal{D}'$ is defined as $\text{SD}(\mathcal{D}, \mathcal{D}') = (\frac{1}{2}) \cdot \Sigma_{\omega \in \Omega} |\mathcal{D}(\omega) - \mathcal{D}'(\omega)|$. A family of distributions $\mathcal{D} = \{\mathcal{D}_\lambda\}_{\lambda \in \mathbb{N}}$ and $\mathcal{D}' = \{\mathcal{D}'_\lambda\}_{\lambda \in \mathbb{N}}$, parameterized by security parameter $\lambda$, are said to be statistically indistinguishable if there is a negligible function $\text{negl}(\bullet)$ such that $\text{SD}(\mathcal{D}_\lambda, \mathcal{D}'_\lambda) \leq \text{negl}(\lambda)$ for all $\lambda \in \mathbb{N}$.

Access Structures and Linear Secret Sharing Schemes

In this subsection, we present the definitions of access structures and linear secret sharing schemes.

Definition (Access Structures): Let $\mathbb{U}$ be the attribute universe. An access structure on $\mathbb{U}$ is a collection $\mathbb{A} \, 2^\mathbb{U} \setminus \emptyset$ of non-empty sets of attributes. The sets in $\mathbb{A}$ are called the authorized sets and the sets not in $\mathbb{A}$ are called the unauthorized sets. An access structure is called monotone if $\forall B, C \in 2^\mathbb{U}$ if $B \in \mathbb{A}$ and $B \subseteq C$, then $C \in \mathbb{A}$.

Definition (Linear Secret Sharing Schemes (LSSS)): Let $q = q(\lambda)$ be a prime and $\mathbb{U}$ the attribute universe. A secret sharing scheme $\Pi$ with domain of secrets $\mathbb{Z}_q$ for a monotone access structure $\mathbb{A}$ over $\mathbb{U}$, a.k.a. a monotone secret sharing scheme, is a randomized algorithm that on input a secret $z \in \mathbb{Z}$ outputs $|\mathbb{U}|$ shares $\text{sh}_1, \ldots, \text{sh}_{|\mathbb{U}|}$ such that for any set $S \in \mathbb{A}$ the shares $\{\text{sh}_i\}_{i \in S}$ determine z and other sets of shares are independent of z (as random variables). A secret sharing scheme $\Pi$ realizing monotone access structures on $\mathbb{U}$ is linear over $\mathbb{Z}_q$ if 1. The shares of a secret $z \in \mathbb{Z}_q$ for each attribute in $\mathbb{U}$ form a vector over $\mathbb{Z}$.
2. For each monotone access structure $\mathbb{A}$ on $\mathbb{U}$, there exists a matrix $M \in \mathbb{Z}_q^{\ell \times s}$, called the share-generating matrix, and a function $\rho: [\ell] \to \mathbb{U}$, that labels the rows of M with attributes from $\mathbb{U}$ which satisfy the following: During the generation of the shares, we consider the vector $v = (z, r_2, \ldots, r_s)$, where $r_2, \ldots, r_s \leftarrow \mathbb{Z}_q$. Then the vector of $\ell$ shares of the secret z according to $\Pi$ is given by $\mu = Mv^T \in \mathbb{Z}_q^{\ell \times 1}$, where for all $j \in [\ell]$ the share $\mu_j$ "belongs" to the attribute $\rho(j)$. We will be referring to the pair $(M, \rho)$ as the LSSS policy of the access structure $\mathbb{A}$.

The correctness and security of a monotone LSSS are formalized in the following: Let S (resp. S') denote an authorized (resp. unauthorized) set of attributes according to some monotone access structure $\mathbb{A}$ and let I (resp. I') be the set of rows of the share generating matrix M of the LSSS policy pair $(M, \rho)$ associated with $\mathbb{A}$ whose labels are in S (resp. S'). For correctness, there exist constants $\{w_i\}_{i \in I}$ in $\mathbb{Z}_q$ such that for any valid shares $\{\mu_i = (Mv^T)_i\}_{i \in I}$ of a secret $z \in \mathbb{Z}_q$ according to $\Pi$, it is true that $\Sigma_{i \in I} w_i \mu_i = z$ (equivalently, $$\sum_{i \in I} w_i M_i = (1, \overbrace{0, \ldots, 0}^{s-1}),$$

where $M_i$ is the ith row of M). For soundness, there does not exists any subset I of the rows of the matrix M and any coefficients $\{w_i\}_{i \in I}$ for which the above hold.

Remark ($NC^1$ and Monotone LSSS): Consider an access structure A described by an $NC^1$ circuit. There is a folklore transformation that converts this circuit to a Boolean formula of logarithmic depth that consists of (fan-in 2) AND, OR, and (fan-in 1) NOT gates. We can further push the NOT gates to the leaves using De Morgan laws, and assume that internal nodes only constitute of OR and AND gates and leaves are labeled either by attributes or by their negations. In other words, we can represent any $NC^1$ policy over a set of attributes into one described by a monotone Boolean formula of logarithmic depth over the same attributes together with their negations. Lewko and Waters presented a monotone LSSS for access structures described by monotone Boolean formulas. This implies that any $NC^1$ access policy can be captured by a monotone LSSS.

Strong Randomness Extractors

The min-entropy of a random variable X is $H_\infty(X) = -\log(\max_x \Pr[X=x])$. A t-source is a random variable X with $H_\infty(X) \geq t$. The statistical distance between two random variables X and Y over a finite domain $\Omega$ is $$SD(X, Y) = \frac{1}{2} \sum_{\omega \in \Omega} |Pr[X = \omega] - Pr[Y = \omega]|.$$

Definition (Seeded Randomness Extractor): A function Ext: $\Omega \times S \to \Gamma$ is a strong $(t, \epsilon)$-extractor if for every t-source X on $\Omega$, $SD((\mathcal{U}_S, \text{Ext}(X, \mathcal{U}_S)), (\mathcal{U}_S, \mathcal{U}_\Gamma)) < \epsilon$.

Theorem: For every n, $t \in \mathbb{N}$ and $\epsilon > 0$, there exists a strong $(t, \epsilon)$-extractor Ext: $\{0, 1\}^n \times \{0,1\}^d \to \{0,1\}^m$ with $m = t - 2 \log(1/\epsilon) - O(1)$ and $d = \log(n-t) + 2 \log(1/\epsilon) + O(1)$.

Fully-Adaptive Decentralized MA-ABE for LSSS

A decentralized multi-authority attribute-based encryption (MA-ABE) system MA-ABE=(GlobalSetup, AuthSetup, KeyGen, Enc, Dec) consists of five procedures whose syntax is given below. The supported access structures that we deal with are ones captured by linear secret sharing schemes (LSSS). We denote by $\mathcal{AU}$ the authority universe and by $\mathcal{GID}$ the universe of global identifiers of the users. We denote by $\mathbb{M}$ the supported message space. Additionally, we assume that each authority controls just one attribute, and hence we would use the terms "authority" and "attribute" interchangeably. This definition naturally generalizes to the situation in which each authority can potentially control an arbitrary (bounded or unbounded) number of attributes.

GlobalSetup($1^\lambda$) $\mapsto$ GP: The global setup algorithm takes in the security parameter $\lambda$ in unary representation and outputs the global public parameters GP for the system. We assume that GP includes the descriptions of the universe of attribute authorities $\mathcal{AU}$ and universe of the global identifiers of the users $\mathcal{GID}$. Note that both $\mathcal{AU}$ and $\mathcal{GID}$ are given by $\{0,1\}^\lambda$ in case there is no bound on the number of authorities and users in the system.

AuthSetup(GP,u) $\mapsto$ (PK$_u$, MSK$_u$): The authority u$\in \mathcal{AU}$ calls the authority setup algorithm during its initialization with the global parameters GP as input and receives back its public and master secret key pair PK$_u$, MSK$_u$.

KeyGen(GP, GID, MSK$_u$) $\mapsto$ SK$_{GID,u}$: The key generation algorithm takes as input the global parameters GP, a user's global identifier GID$\in \mathcal{GID}$, and a master secret key MSK$_u$ of an authority u$\in \mathcal{AU}$. It outputs a secret key SK$_{GID,u}$ for the user.

Enc(GP, msg, (M, $\rho$), {PK$_u$}) $\mapsto$ CT: The encryption algorithm takes in the global parameters GP, a message msg$\in \mathbb{M}$, an LSSS access policy (M, $\rho$) such that M is a matrix over $\mathbb{Z}_N$ and $\rho$ is a row-labeling function that assigns to each row of M an attribute/authority in $\mathcal{AU}$, and the set {PK$_u$} of public keys for all the authorities in the range of $\rho$. It outputs a ciphertext CT. We assume that the ciphertext implicitly contains (M, $\rho$).

Dec(GP, CT, {SK$_{GID,u}$}) $\mapsto$ msg': The decryption algorithm takes in the global parameters GP, a ciphertext CT generated with respect to some LSSS access policy (M, $\rho$), and a collection of keys {SK$_{GID,u}$} corresponding to user ID-attribute pairs {(GID, u)} possessed by a user with global identifier GID. It outputs a message msg' when the collection of attributes associated with the secret keys {SK$_{GID,u}$} satisfies the LSSS access policy (M, $\rho$), i.e., when the vector (1, 0, . . . , 0) is contained in the linear span of those rows of M which are mapped by p to some attribute/authority u$\in \mathcal{AU}$ such that the secret key SK$_{GID,u}$ is possessed by the user with global identifier GID. Otherwise, decryption fails.

Correctness: An MA-ABE scheme for LSSS-realizable access structures is said to be correct if for every $\lambda \in \mathbb{N}$, every message msg$\in \mathbb{M}$, and GID$\in \mathcal{GID}$, every LSSS access policy (M, $\rho$), and every subset of authorities U$\subseteq \mathcal{AU}$ controlling attributes which satisfy the access structure, it holds that $$Pr\begin{bmatrix} GP \leftarrow GlobalSetup(1^\lambda) \\ \forall u \in U\colon PK_u, MSK_u \leftarrow AuthSetup(GP, u) \\ msg' = msg | \forall u \in U\colon SK_{GID,u} \leftarrow KeyGen(GP, GID, MSK_u) \\ CT \leftarrow Enc(GP, msg, (M, \rho), PK_u) \\ msg' = Dec(GP, CT, SK_{GID, u_{u \in U}}) \end{bmatrix} = 1.$$

Fully Adaptive Security: We define the fully adaptive (chosen-plaintext) security for a decentralized MA-ABE scheme, namely, we consider a security game where there could be adaptive secret key queries, adaptive authority corruption queries, and adaptive challenge ciphertext query. This is formalized in the following game between a challenger and an attacker. Note that we will consider two types of authority public keys, those which are honestly generated by the challenger and those which are supplied by the attacker itself where the former type of authority keys can be corrupted by the attacker at any point of time during the game and the latter type of authority keys can potentially be malformed.

The game consists of the following phases:

Global Setup: The challenger runs GlobalSetup to generate global public parameters GP and gives it to the attacker.

Query Phase 1: The attacker is allowed to adaptively make a polynomial number of queries of the following types:

Authority Setup Queries: The attacker request to set up an authority u$\in \mathcal{AU}$ of its choice. If an authority setup query for the same authority u has already been queried before, the challenger aborts. Otherwise, the challenger runs AuthSetup to create a public/master key pair (PK$_u$, MSK$_u$) for the authority u. The challenger provides PK$_u$ to the attacker and stores (PK$_u$, MSK$_u$). Note that the challenger does not return the generated public/master key pair to the attacker.

Secret Key Queries: The attacker makes a secret key query by submitting a pair (GID, u) to the challenger, where GID$\in \mathcal{GID}$ is a global identifier and u$\in \mathcal{AU}$ is an attribute authority. If an authority setup query for the authority u has not been made already, the challenger aborts. Otherwise, the challenger runs KeyGen using the public/master key pair it already created in response to authority setup query for u and generates a secret key SK$_{GID,u}$ for (GID, u). The challenger provides SK$_{GID,u}$ to the attacker.

Authority Master Key Queries: The attacker requests the master secret key of an authority u$\in \mathcal{AU}$ to the challenger. If an authority setup query for the authority u has not been made previously, the challenger aborts. Otherwise, the challenger provides the attacker the master secret key MSK$_u$ for the authority u it created in response to the authority setup query for u.

Challenge Phase: The attacker submits two messages, msg$_0$, msg$_i \in \mathbb{M}$ and an LSSS access structure (M, $\rho$). The attacker also submits the public keys {PK$_u$} for a subset of attribute authorities appearing in the LSSS access structure (M, $\rho$). The authority public keys {PK$_u$} supplied by the attacker can potentially be malformed, i.e., can fall outside the range of AuthSetup. The LSSS access structure (M, $\rho$) and the authority public keys {PK$_u$} must satisfy the following constraints.

(a) Let $U_{\mathcal{A}}$ denote the set of attribute authorities for which the attacker supplied the authority public keys {PK$_u$}. Also let $U_{\mathcal{B}}$ denote the set of attribute authorities for which the challenger created the master public key pairs in response to the authority setup query of the attacker so far. Then, it is required that $U_{\mathcal{A}} \cap U_{\mathcal{B}} = \emptyset$.

(b) Let V denote the subset of rows of M labeled by the authorities in $U_{\mathcal{A}}$ plus the authorities for which the attacker made a master key query so far. For each global identifier GID$\in \mathcal{GID}$, let V$_{GID}$ denote the subset of rows of M labeled by authorities u such that the attacker queried a secret key for the pair (GID, u). For each GID$\in \mathcal{GID}$, it is required that the rows of M labeled by authorities in V$\cup$V$_{GID}$ do not span (1, 0, . . . , 0).

The challenger flips a random coin b$\leftarrow$ {0,1} and generates a ciphertext CT by running the Enc algorithm that encrypts msg$_b$ under the access structure (M, $\rho$).

Query Phase 2: The attacker is allowed to make all types of queries as in Query Phase 1 as long as they do not violate the constraints Properties (a) and (b).

Guess: The attacker must submit a guess b' for b. The attacker wins if b=b'.

The advantage of an adversary in this game is defined as:

$$Adv_{\mathcal{A}}^{MA\text{-}ABE, fully\text{-}adaptive}(\lambda) = |Pr[b' = b] - 1/2|.$$

Definition (Fully adaptive security for MA-ABE for LSSS): An MA-ABE scheme for LSSS-realizable access structures is fully adaptively secure if for any PPT adversary $\mathcal{A}$ there exists a negligible function negl(•) such that for all $\lambda \in \mathbb{N}$, we have $\mathrm{Adv}_{\mathcal{A}}^{\text{MA-ABE,fully-adaptive}}(\lambda) \leq \mathrm{negl}(\lambda)$.

Remark (Fully adaptive security of MA-ABE for LSSS in the Random Oracle Model): We additionally consider the aforementioned notion of fully adaptive security in the random oracle model. In this context, we assume a global hash function H published as part of the global public parameters and accessible by all the parties in the system, including the attacker. In the security proof, we model H as a random function and allow it to be programmed by the challenger. Therefore, in the fully adaptive security game described above, we further let the adversary adaptively submit H-oracle queries to the challenger, along with the key queries it makes both before and after the challenge ciphertext query.

Composite Order Group MA-ABE Scheme

Below is described the composite order bilinear groups and the assumptions on which our construction relies and give the construction.

Composite Order Bilinear Groups and Assumptions

Our system relies on composite order bilinear groups. Particularly, we will rely on a bilinear group $\mathbb{G}$ of composite order N which is a product of three primes, that is, $N = p_1 p_2 p_3$. Such a group has unique subgroups of order q for all divisor q of N and we will denote such a subgroup as $\mathbb{G}_q$. Also every element $g \in \mathbb{G}$, can be written (uniquely) as the product of an element of $\mathbb{G}_{p_1}$, an element of $\mathbb{G}_{p_2}$, and an element of $\mathbb{G}_{p_3}$. We refer to these elements as the "$\mathbb{G}_{p_1}$ part of g", the "$\mathbb{G}_{p_2}$ part of g", and the "$\mathbb{G}_{p_3}$ part of g", respectively. We shall assume that there is a procedure $\mathcal{G}(1^\lambda)$ that gets as input a security parameter $\lambda$ and outputs $G = (N = p_1 p_2 p_3, \mathbb{G}, \mathbb{G}_T, e)$, where $e: \mathbb{G} \times \mathbb{G} \to \mathbb{G}_T$ is a pairing. We assume that the group operations in $\mathbb{G}$ and $\mathbb{G}_T$ as well as the bilinear map e are computable in polynomial time in $\lambda$. Further, we assume that e satisfies the following:

1. (Bilinear) $\forall g, h \in \mathbb{G}, a, b \in \mathbb{Z}_N, e(g^a, h^b) = e(g, h)^{ab}$.
2. (Non-degenerate) $\exists g \in \mathbb{G}$ such that $e(g, g)$ has order N in $\mathbb{G}_T$.

The Construction

Here, we present the MA-ABE for $NC^1$ construction in composite order bilinear groups. As mentioned, we assume that each authority controls just one attribute, and hence we would use the terms "authority" and "attribute" interchangeably.

GlobalSetup($1^\lambda$): The global setup algorithm takes in the security parameter $1^\lambda$ encoded in unary. The procedure first chooses primes $p_1, p_2, p_3$ and let $N = p_1 p_2 p_3$. Next, it generates a bilinear group $G = (N, \mathrm{Adv}_{\mathcal{A}}^{\text{MA-ABE,fully-adaptive}}, \mathbb{G}_T, e)$ of order N. Let $\mathbb{G}_{p_1}$ be the subgroup of $\mathbb{G}$ of order $p_1$ and let $g_1$ and h be uniformly random generators of the subgroup $\mathrm{Adv}_{\mathcal{A}}^{\text{MA-ABE,fully-adaptive}}{}_{p_1}$. We make use of a strong seeded randomness extractor Ext: $\mathbb{G}_T \times S \to \mathbb{M}$, where $\mathbb{M} \subset \{0,1\}^*$ is the message space and $S \subset \{0,1\}^*$ is the seed space. The algorithm samples a seed $\text{seed} \leftarrow S$. It sets the global parameters $GP = (G, g_1, h, \text{seed})$. Furthermore, we make use of a hash function $H: \{0,1\}^* \to \mathbb{G}$ mapping global identities $GID \in \mathcal{GID}$ to elements in $\mathbb{G}$.

AuthSetup(GP, H, u): Given the global parameters GP, the hash function H, and an authority index $u \in \mathcal{AU}$, the algorithm chooses random values $y_{A,u}, y_{B,u} \in \mathbb{Z}_N$ and outputs $$PK_u = \left(P_{A,u} = g_1^{y_{A,u}}, P_{B,u} = g_1^{y_{B,u}}\right) \quad MSK_u = (y_{A,u}, y_{B,u}).$$

Enc(GP, H, msg, (M, $\rho$), $\{PK_u\}$): The encryption algorithm takes as input the global parameters GP, the hash function H, a message $\mathrm{msg} \in \mathbb{M}$ to encrypt, an LSSS access structure (M,$\rho$), where $M = (M_{x,j})_{\ell \times d} = (M_1, \ldots, M_\ell)_T \in \mathbb{Z}_N^{\ell \times d}$ and $\rho[\ell] \to \mathcal{AU}$, and public keys of the relevant authorities $\{PK_u\}$. The function $\rho$ associates rows of M to authorities (recall that we assume that each authority controls a single attribute). We assume that $\rho$ is an injective function, that is, an authority/attribute is associated with at most one row of M.

It first chooses a random value $s \leftarrow \mathbb{Z}_N$. It then uses the LSSS access structure (M, $\rho$) to generate a secret sharing of s where $\sigma_{A,x}$ will be the share for all $x \in [\ell]$, i.e, for all $x \in [\ell]$, let $\sigma_{A,x} = M_x \cdot v_A$, where $v_A \leftarrow \mathbb{Z}_N^d$ is a random vector with s as its first entry and $M_x$ is the $x^{th}$ row of M. It additionally creates another secret sharing of $-s$ with respect to the LOSS access policy (M, $\rho$) where $\sigma_{B,x}$ is the corresponding share for $\rho(x)$ for all $x \in [\ell]$, i.e., for all $x \in [\mathbb{Z}_N^{\ell \times d}]$, $\sigma_{B,x} = M_x \cdot v_B$, where $v_B \leftarrow \mathbb{Z}_N^d$ is a random vector with $-s$ as its first entry. The procedure generates the ciphertext as follows: For each row $x \in [\ell]$, it chooses random $r_{A,x}, r_{B,x} \leftarrow \mathbb{Z}_N$ and outputs the ciphertext $$CT = \left((M, \rho), C, \{C_{1,A,x}, C_{2,A,x}, C_{1,B,x}, C_{2,B,x}\}_{x \in [\ell]}\right), \text{ where}$$

$$C = \mathrm{msg} \oplus \mathrm{Ext}(e(g_1, h)^s, \text{seed}),$$

$$C_{1,A,x} = g_1^{r_{A,x}} \quad C_{2,A,x} = P_{A,\rho(x)}^{r_{A,x}} g_1^{\sigma_{A,x}} = g_1^{y_{A,\rho(x)} r_{A,x}} g_1^{\sigma_{A,x}}$$

$$C_{1,B,x} = g_1^{r_{B,x}} \quad C_{2,B,x} = P_{B,\rho(x)}^{r_{B,x}} g_1^{\sigma_{B,x}} = g_1^{y_{B,\rho(x)} r_{B,x}} g_1^{\sigma_{B,x}}.$$

KeyGen(GP, H, GID, $MSK_u$): The key generation algorithm takes as input the global parameters GP, the hash function H, the user's global identifier $GID \in \mathcal{GID}$, and the authority's master secret key $MSK_u$. It generates a secret key $SK_{GID,u}$ for GID as $$SK_{GID,u} = (K_{GID,A,u}, K_{GID,B,u}) \text{ where}$$

$$K_{GID,A,u} = (H(GID) \cdot h)^{y_{A,u}} \quad K_{GID,B,u} = (H(GID))^{y_{B,u}}.$$

Dec(GP, H, CT, GID, $\{SK_{GID,u}\}$): Decryption takes as input the global parameters GP, the hash function H, a ciphertext CT for an LSSS access structure (M, $\rho$) with $M \in \mathbb{Z}_N^{\ell \times d}$ and $\rho: [\ell] \to \mathcal{AU}$ injective, the user's global identifier $GID \in \mathcal{GID}$, and the secret keys $\{SK_{GID,u}\}_{u \in \rho(I)}$ corresponding to a subset of rows of M with indices $I \subseteq [\ell]$. If $(1, 0, \ldots, 0)$ is not in the span of these rows, $M_I$, then decryption fails. Otherwise, the decryptor finds $\{w_x \in_N\}_{x \in I}$ such that $(1, 0, \ldots, 0) = \sum_{x \in I} w_x \cdot M_x$.

For all $x \in I$, the decryption algorithm first compute:

$$D_{A,x} = e(C_{2,A,x}, H(GID) \cdot h) \cdot e(C_{1,A,x}, K_{GID,A,\rho(x)})^{-1} = e(g_1, H(GID) \cdot h)^{\sigma_{A,x}}$$

$$D_{B,x} = e(C_{2,B,x}, H(GID)) \cdot e(C_{1,B,x}, K_{GID,B,\rho(x)})^{-1} = e(g_1, H(GID))^{\sigma_{B,x}}$$

Then compute $D = \prod_{x \in I} (D_{A,x} \cdot D_{B,x})^{w_x} = e(g_1, h)^s$. Finally it outputs $C \oplus \mathrm{Ext}(D, \text{seed}) = \mathrm{msg}$.

The Prime Order Group MA-ABE Scheme

Below, we recall prime order bilinear groups and give the associated notations, give the basis structure of the translation framework, give the assumptions on which our construction relies, and give the construction.

Prime Order Bilinear Groups and Associated Notations

Notations: Let A be a matrix over the ring $\mathbb{Z}_q$. We use span(A) to denote the column span of A, and we use span$^m$(A) to denote matrices of width m where each column lies in span(A); this means M←span$^m$(A) is a random matrix of width m where each column is chose uniformly from span(A). We use basis(A) to denote a basis of span(A), and we use $(A_1\|A_2)$ to denote the column-wise concatenation of matrices $A_1$, $A_2$. We let I be the identity matrix and 0 be a zero matrix whose size will be clear from the context.

Fix a security parameter, for any bilinear group parameter $G=(p, \mathbb{G}_1, \mathbb{G}_2, \mathbb{G}_T, g_1, g_2, e)$ and any i=1, 2, T with $g_T=e(g_1, g_2)$, we write $[[M_i]]$ for $g_i^M$ where the exponentiation is element-wise. When bracket notation is used, we denote group operations with $\boxplus$, i.e., $[[M]]_i \boxplus [[N]]_i=[[M+N]]_i$ for matrices M, N, and $\boxminus$ as their negatives, i.e., $[[M]]_i \boxminus [[N]]_i=[[M+N]]_i$. Also, we define $N \odot [[M]]_i=[[NM]]_i$; and $[[M]]_i \odot N=[[MN]]_i$. We also slightly abuse notations and use the original pairing notation e to denote the pairing between matrices of group elements as well, i.e., we write $e([[M]]_1, [[N]]_2)=[[MN]]_T$.

Prime Order Bilinear Groups: Let $\mathbb{G}_1$, $\mathbb{G}_2$ and $\mathbb{G}_T$ be three multiplicative cyclic groups of prime order $p=p(\lambda)$ where the group operations are efficiently computable in the security parameter $\lambda$ and there is no isomorphism between $\mathbb{G}_1$ and $\mathbb{G}_2$ that can be computed efficiently in $\lambda$. Let $g_1$, $g_2$ be generators of $\mathbb{G}_1$, $\mathbb{G}_2$ respectively and e: $\mathbb{G}_1 \times \mathbb{G}_2 \to \mathbb{G}_T$ be an efficiently computable pairing function that satisfies the following properties:

Bilinearity: for all $u \in \mathbb{G}_1$, $v \in \mathbb{G}_2$ and a, $b \in \mathbb{Z}_p$ it is true that $e(u^a, v^b)=e(u, v)^{ab}$.

Non-degeneracy: $e(g_1, g_2) \neq 1_{G_T}$, where $1_{G_T}$ is the identity element of the group $\mathbb{G}_T$.

Let $\mathcal{G}$ be an algorithm that takes as input $1^\lambda$, the unary encoding of the security parameter $\lambda$, and outputs the description of an asymmetric bilinear group $G=(p, \mathbb{G}_1, \mathbb{G}_2, \mathbb{G}_T, g_1, g_2, e)$.

The Construction

Here, we present the MA-ABE for NC$^1$ construction in prime order bilinear groups. As mentioned, we assume that each authority controls just one attribute, and hence we would use the terms "authority" and "attribute" interchangeably.

GlobalSetup($1^\lambda$): The global setup algorithm takes in the security parameter $1^\lambda$ encoded in unary. The procedure first chooses a prime p. Next it generates a bilinear group $G=(p, \mathbb{G}_1, \mathbb{G}_2, \mathbb{G}_T, g_1, g_2, e)$ of order p. Let $g_1$, $g_2$ be the generators of $\mathbb{G}_1$, $\mathbb{G}_2$ respectively. We make use of a strong seeded randomness extractor Ext: $\mathbb{G}_T \times S \to \mathbb{M}$, where $\mathbb{M} \subset \{0,1\}^*$ is the message space and $S \subset \{0,1\}^*$ is the seed space. The algorithm samples a seed seed←S. Next, the algorithm samples $$A_1, A_2, A_3 \leftarrow \mathbb{Z}_p^{3k \times k}, h \leftarrow \mathbb{Z}_p^k.$$

Let $(A_1^*\|A_2^*\|A_3^*)=((A_1\|A_2\|A_3)^{-1})^T$ where $A_1^*$, $A_2^*$, $A_3^* \leftarrow \mathbb{Z}_p^{2k \times k}$ such that $A_i^T A_j^*=1$ if i=j, and 0 if i≠j for all i,j $\in$ [3]. It outputs the global parameters as $GP=(G,[[A_1]]_1, H=[[A_1^*h]]_2, \text{seed})$.

Furthermore, we assume that all parties has access to the hash function $H:\{0,1\}^* \to \mathbb{G}_2^{3k}$ mapping global identifiers $GID \in \mathcal{GID}$ to random vectors in $\mathbb{G}_2^{3k}$, i.e., for all $GID \in \mathcal{GID}$ we have $H(GID)=[[h_{GID}]]_2$ for some $h_{GID} \leftarrow \mathbb{Z}_p^{3k}$.

AuthSetup(GP, u): Given the global parameters GP and an authority index $u \in \mathcal{AU}$, the algorithm chooses random matrices $W_{A,u}$, $W_{B,u} \in \mathbb{Z}_p^{3k \times 3k}$ and outputs $PK_u =$ $\left(P_{A,u} = W_{A,u}^T \odot [[A_1]]_1, P_{B,u} = W_{B,u}^T \odot [[A_1]]_1\right) = \left([[W_{A,u}^T A_1]]_1, [[W_{B,u}^T A_1]]_1\right)$ $MSK_u = (W_{A,u}, W_{B,u}).$ Enc(GP, msg, (M, ρ), {$PK_u$}): The encryption algorithm takes as input the global parameters GP, a message msg $\in \mathbb{M}$ to encrypt, an LSSS access structure (M, ρ), where $M=(M_{x,f})_{\ell \times d} =(M_1, \ldots, M_\ell)^T \in \mathbb{Z}_N^{\ell \times d}$ and ρ: $[\ell] \to \mathcal{AU}$, and public keys of the relevant authorities {$PK_u$}. The function ρ associates rows of M (viewed as column vectors) to authorities (recall that we assume that each authority controls a single attribute). We assume that ρ is an injective function, that is, an authority/attribute is associated with at most one row of M.

It first samples a random vector $d \leftarrow \mathbb{Z}_p^k$ and random matrices $U_A$, $U_B \leftarrow \mathbb{Z}_p^{3k \times (d-1)}$. The procedure generates the ciphertext as follows: For each row $x \in [\ell]$, it chooses random vectors $s_{A,x}$, $s_{B,x} \leftarrow \mathbb{Z}_p^k$ and outputs the ciphertext $CT = ((M, \rho), C, \{C_{1,A,x}, C_{2,A,x}, C_{1,B,x}, C_{2,B,x}\}_{x \in [\ell]}),$ where $C = msg \oplus Ext(e([[A_1 d]]_1, H), \text{seed}),$ and $C_{1,A,x} = [[A_1]]_1 \odot s_{A,x} = [[A_1 s_{A,x}]]_1$ $C_{2,A,x} = ([[A_1]]_1 \odot d\|[[U_A]]_1) \odot M_x + [[W_{A,\rho(x)}^T A_1]]_1 \odot s_{A,x} =$
$\qquad [[(A_1 d \| U_A) M_x + W_{A,\rho(x)}^T A_1 s_{A,x}]]_1$ $C_{1,B,x} = [[A_1]]_1 \odot s_{B,x} = [[A_1 s_{B,x}]]_1$ $C_{2,B,x} = ([[A_1]]_1 \odot (-d)\|[[U_B]]_1) \odot M_x + [[W_{B,\rho(x)}^T A_1]]_1 \odot s_{B,x} =$
$\qquad [[(-A_1 d \| U_B) M_x + W_{B,\rho(x)}^T A_1 s_{B,x}]]_1.$ KeyGen(GP, GID, $MSK_u$): The key generation algorithm takes as input the global parameters GP, the user's global identifier $GID \in \mathcal{GID}$, and the authority's master secret key $MSK_u$. It generates a secret key $SK_{GID,u}$ for GID as $SK_{GID,u} = (K_{GID,A,u}, K_{GID,B,u})$ where $K_{GID,A,u} = W_{A,u} \odot (H(GID) \cdot H) = [[W_{A,u} \cdot (h_{GID} + A_1^* h)]]_2$ $K_{GID,B,u} = W_{B,u} \odot H(GID) = [[W_{B,u} \cdot h_{GID}]]_2$ Dec(GP, CT, GID, {$SK_{GID,u}$}): Decryption takes as input the global parameters GP, a ciphertext CT for an LSSS access structure (M,ρ) with $M \in \mathbb{Z}_N^{\ell \times d}$ and ρ: $[\ell] \to \mathcal{AU}$ injective, the user's global identifier $GID \in \mathcal{GID}$, and the secret keys {$SK_{GID,u}\}_{u \in \rho(I)}$ corresponding to a subset of rows of M with indices $I \subseteq [\ell]$. If $(1, 0, \ldots, 0)$ is not in the span of these rows, $M_I$, then decryption fails. Otherwise, the decryptor finds $\{w_x \in_N\}_{x \in I}$ such that $(1, 0, \ldots, 0) = \Sigma_{x \in I} w_x \cdot M_x^T$.

For all $x \in I$, the decryption algorithm first computes:

$$D_{A,x} = e(C_{2,A,x}, [[h_{GID} + A_1^*h]]_2)e(C_{1,A,x}, K_{GID,A,\rho(x)})^{-1} =$$
$$[[((A_1d\|U_A)M_x)^\top \cdot (h_{GID} + A_1^*h)]]_2$$

$$D_{B,x} = e(C_{2,B,x}, [[h_{GID}]]_2)e(C_{1,B,x}, K_{GID,B,\rho(x)})^{-1} =$$
$$[[((-A_1d\|U_B)M_x)^\top \cdot h_{GID}]]_2$$

Then computes $D = \Pi_{x \in I}(D_{A,x} \cdot D_{B,x})^{w_x} = e([[A_1d]]_1, H)$.

Finally it outputs $C \oplus \text{Ext}(D, \text{seed}) = \text{msg}$.

System Implementation

With reference to FIG. 1, an example system architecture for a decentralized multi-authority attribute-based encryption scheme is illustrated. The Owner 105 of a message, such any arbitrary data, can encrypt the message as described herein and store the resulting ciphertext in a Cloud Storage 110. Another user, illustrated as Accessor 115, may retrieve this ciphertext from Cloud Storage 110. Multiple Authorities 120 may be instantiated for managing public and secret keys. The Authorities 120 may distribute private key to data Owner 105, and secret keys to Accessor 115. As described herein, the user can only decrypt the ciphertext if the user has at least the predetermined number of attributes from the requisite authorities.

Figure 2:
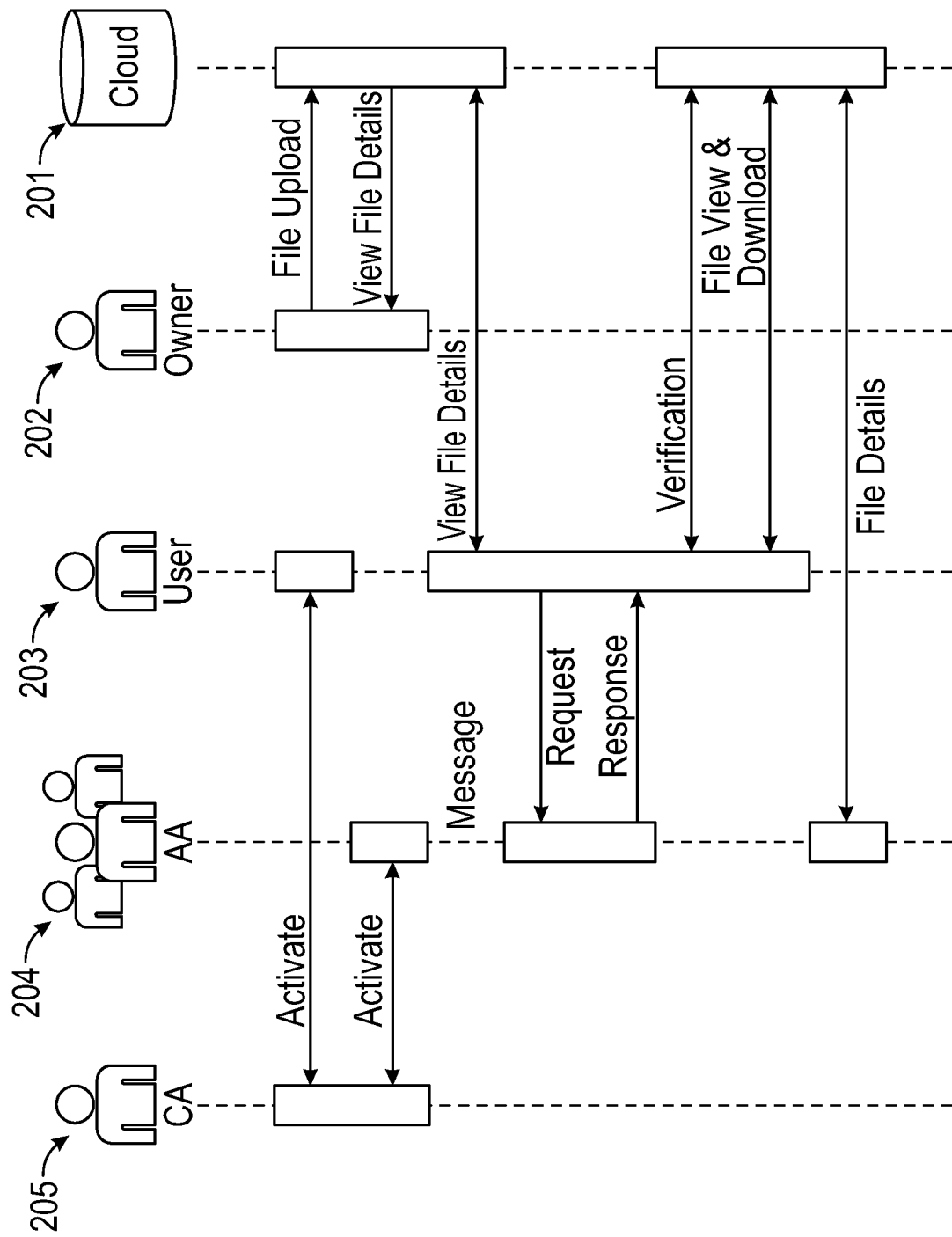
FIG. 2 illustrates an example sequence diagram for a decentralized multi-authority attribute-based encryption scheme.

With reference to FIG. 2, an example sequence diagram for a decentralized multi-authority attribute-based encryption scheme is illustrated. Arbitrary data may be stored in Cloud 201. Data Owner 202 may have caused the data to be uploaded to the cloud. Subsequently, User 203 may wish to obtain the data from the Cloud 201. User 203 may initially view file details and request a key from Authority 204. While only a single Authority 204 is illustrated here, multiple authorities can be instantiated and the user may be in communication with multiple of the authorities.

Figure 3:
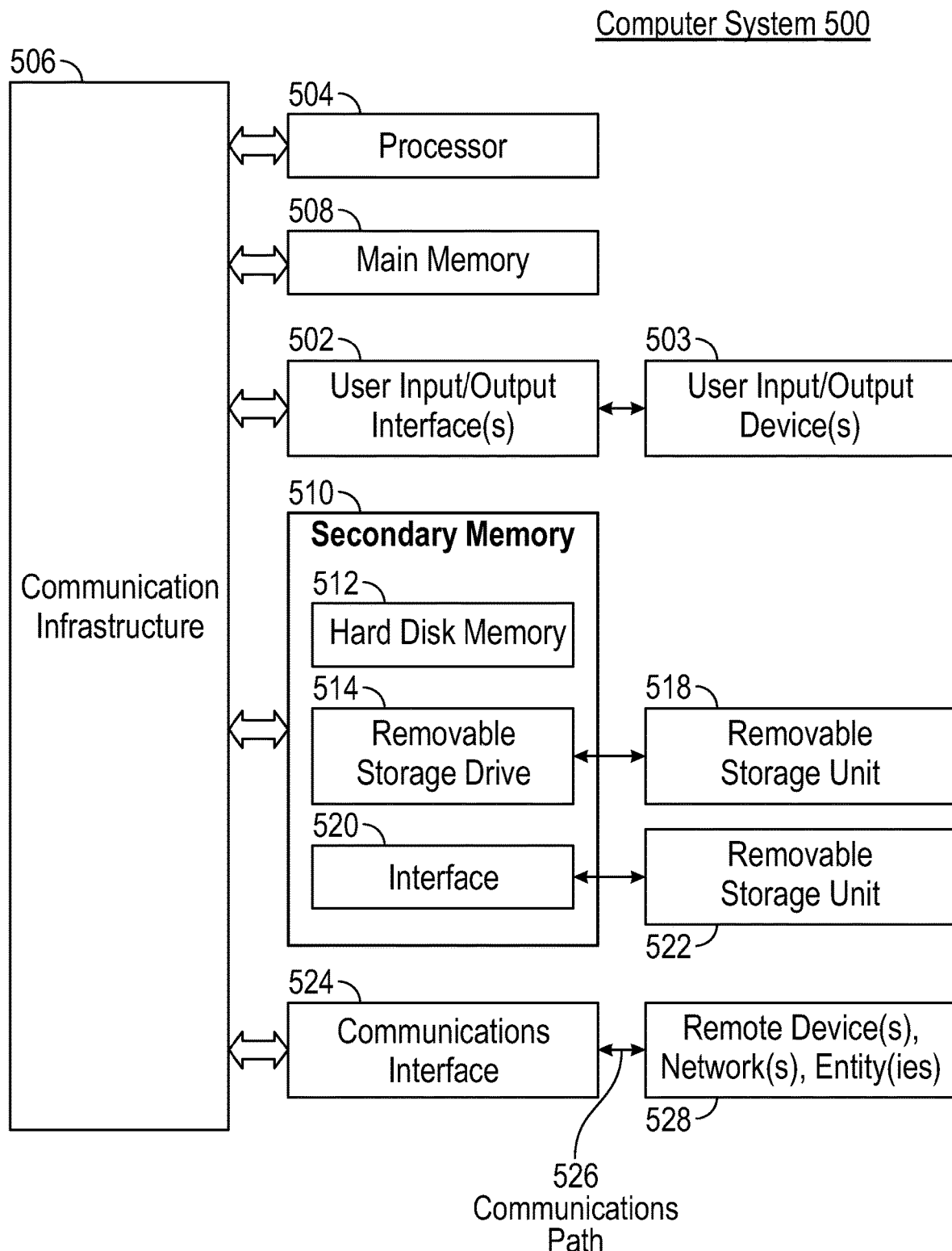
FIG. 3 illustrates an example computer system architecture for implementing the claimed systems and methods.
Figure 4:
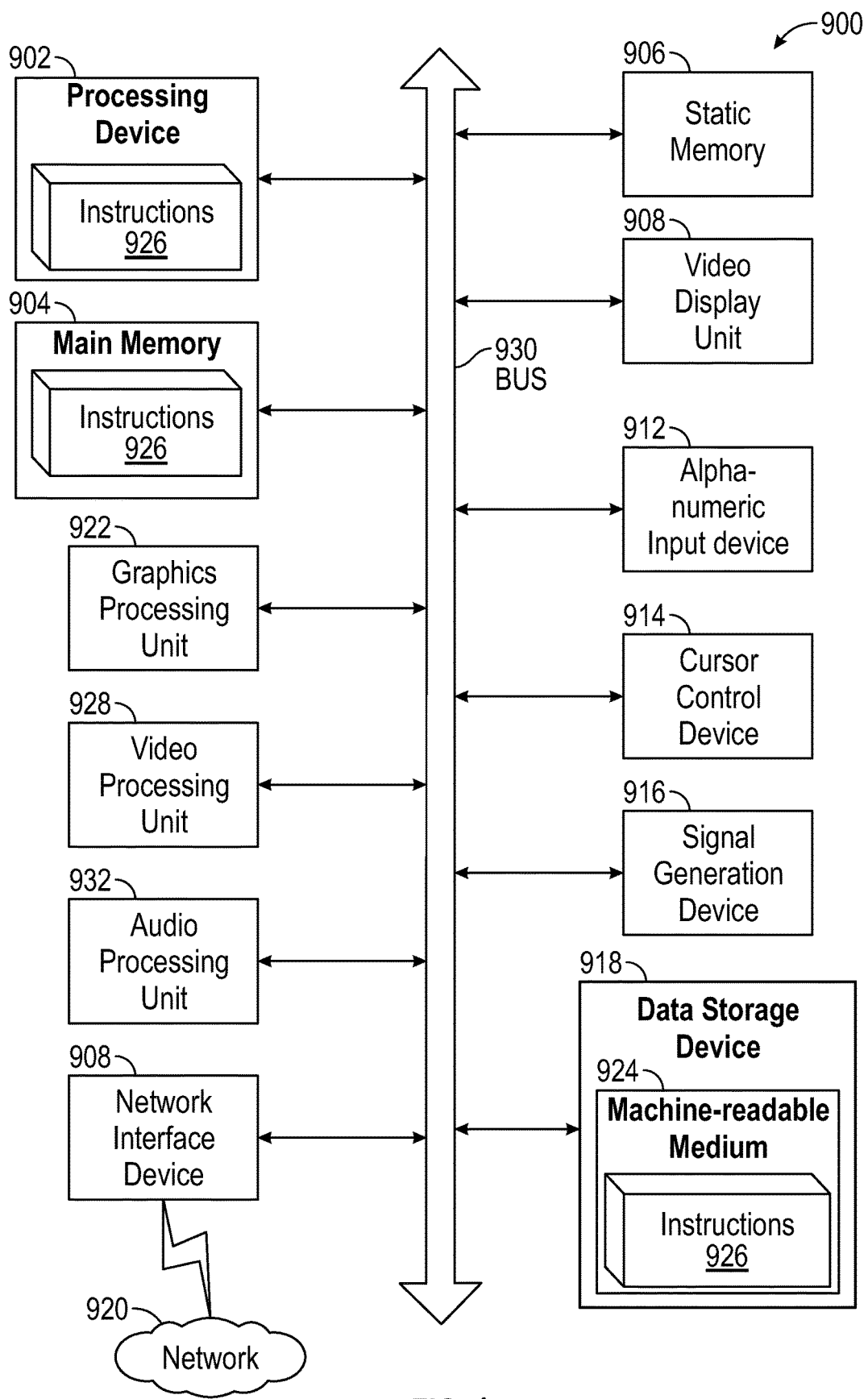
FIG. 4 illustrates further details of an example computer system architecture for implementing the claimed systems and methods.

FIGS. 3 and 4 depict example computer systems useful for implementing various embodiments described in the present disclosure. Various embodiments may be implemented, for example, using one or more computer systems, such as computer system 500 shown in FIG. 3. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity (ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 4 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 3 and 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized system for encrypting a message according to a multi-authority attribute-based encryption scheme, the system comprising a processor configured for:

receiving an electronic message m comprising m; bits for encryption;

storing the electronic message in a computerized storage media;

executing a global setup algorithm to generate global parameters by generating a group G;

sampling g and h as two generators of the group G;

sampling seed for a seeded extractor;

executing an authority setup algorithm to generate a public and secret key pair by:

sampling two exponents $y_A$ and $y_B$;

setting a public key to be $(g^{\{y_A\}}, g^{\{y_B\}})$;

setting a secret key to be $(y_A$ and $y_B)$;

executing an encryption algorithm for the message m and an access policy M, by:

sampling s, $r_A$, $r_B$;

computing:

$$C_{\{1,A\}} = g^{\{r_A\}}; C_{\{1,B\}} = g^{\{r_B\}}; C_{\{2,A\}} = g^{\{y_A * r_A\}} g^{\{s\}}; C_{\{2,B\}} = g^{\{y_B * r_B\}} g^{\{-s\}};$$

$$C = m \, xorExt(e(g, h), seed)$$

wherein e is a bilinear pairing;

storing (C, $C_{\{1,A\}}$, $C_{\{1,B\}}$, $C_{\{2,A\}}$, $C_{\{2,B\}}$), as the encrypted message in a computerized storage media, wherein Ext is a seeded randomness extractor; and executing a key generation algorithm, by outputting $(H(GID)*h)^{\{y_A\}}$ and $(H(GID))^{\{y_B\}}$, where H is a global cryptographic hash function mapping to the group G, wherein the GID is a user global identifier.

2. The computerized system for encrypting the message of claim 1, wherein any party can join as an authority at any point in time and there is no limit to the number of authorities.

3. The computerized system for encrypting the message of claim 1, wherein the method is fully adaptively secure.

4. The computerized system for encrypting the message of claim 1, wherein the method is provably fully adaptively secure, such that it is secure against an attacker that may corrupt one or more authorities as well as perform key queries adaptively throughout a lifetime of the system.

5. The computerized system for encrypting the message of claim 4, wherein the adversary does not hold enough secret keys or authority master keys to decrypt a message that is encrypted with respect to the access structure.

6. The computerized system for encrypting the message of claim 1, wherein the computerized processor is further configured to decrypt the message by:
  storing the message encrypted according to an attribute-based encryption scheme in the computerized storage media;
  executing a decryption algorithm, by:
    receiving a key comprising components generated as $(K_{\{GID,A\}}, K_{\{GID,B\}})$ and a ciphertext $(C, C_{\{1,A\}}, C_{\{1,B\}}, C_{\{2,A\}}, C_{\{2,B\}})$;
    computing $D_A = e(C_{\{2,A\}}, H(GID)*h)/e(C_{\{1,A\}}, K_{\{GID,A\}})$;
    computing $D_B = e(C_{\{2,B\}}, H(GID))/e(C_{\{1,B\}}, K_{\{GID,B\}})$;
    outputting $C$ xor Ext $(D_A*D_B, \text{seed})$.

7. A computerized method for encrypting a message according to a multi-authority attribute-based encryption scheme, the method comprising:
  storing the electronic message in a computerized storage media;
  executing a global setup algorithm to generate global parameters by generating a group G;
  sampling g and h as two generators of the group G;
  sampling seed for a seeded extractor;
  executing an authority setup algorithm to generate a public and secret key pair by:
    sampling two exponents $y_A$ and $y_B$;
    setting a public key to be $(g^{\{y_A\}}, g^{\{y_B\}})$;
    setting a secret key to be $(y_A$ and $y_B)$;
  executing an encryption algorithm for the message m and an access policy M, by:
    sampling s, rA, rB;
    computing:

$$C_{\{1,A\}} = g^{\{r_A\}}; C_{\{1,B\}} = g^{\{r_B\}}; C_{\{2,A\}} = g^{\{y_A*r_A\}}g^{\{s\}}; C_{\{2,B\}} = g^{\{y_B*r_B\}}g^{\{-s\}};$$

$$C = m \, xorExt(e(g,h), \text{seed}),$$

wherein e is a bilinear pairing;
  storing $(C, C_{\{1,A\}}, C_{\{1,B\}}, C_{\{2,A\}}, C_{\{2,B\}})$, as the encrypted message in a computerized storage media, wherein Ext is a seeded randomness extractor; and
  executing a key generation algorithm, by outputting $(H(GID)*h)^{\{y_A\}}$ and $(H(GID))^{\{y_B\}}$, where H is a global cryptographic hash function mapping to the group G, wherein the GID is a user global identifier.

8. The computerized method for encrypting the message of claim 7, wherein any party can join as an authority at any point in time and there is no limit to the number of authorities.

9. The computerized method for encrypting the message of claim 7, wherein the method is fully adaptively secure.

10. The computerized method for encrypting the message of claim 7, wherein the method is provably fully adaptively secure, such that it is secure against an attacker that may corrupt one or more authorities as well as perform key queries adaptively throughout a lifetime of the system.

11. The computerized method for encrypting the message of claim 10, wherein the adversary does not hold enough secret keys or authority master keys to decrypt a message that is encrypted with respect to the access structure.

12. The computerized method of claim 7, the method further comprising decrypting a message according to the multi-authority attribute-based encryption scheme, the method comprising:
  storing the message encrypted according to an attribute-based encryption scheme in the computerized storage media;
  executing a decryption algorithm, by:
    receiving a key comprising components generated as $(K_{\{GID,A\}}, K_{\{GID,B\}})$ and a ciphertext $(C, C_{\{1,A\}}, C_{\{1,B\}}, C_{\{2,A\}}, C_{\{2,B\}})$;
    computing $D_A = e(C_{\{2,A\}}, H(GID)*h)/e(C_{\{1,A\}}, K_{\{GID,A\}})$;
    computing $D_B = e(C_{\{2,B\}}, H(GID))/e(C_{\{1,B\}}, K_{\{GID,B\}})$;
    outputting $C$ xor Ext$(D_A*D_B, \text{seed})$.

* * * * *